United States Patent Office 3,318,841
Patented May 9, 1967

---

3,318,841
STABILIZED ISOTACTIC POLYPROPYLENE CONTAINING A COBALT DITHIOCARBAMATE
Arthur R. Tomlinson, Garden City, Chester, and Harry H. Hall and William F. Geigle, Springfield, Pa.; said Tomlinson and said Hall assignors, by mesne assignments, to Avisun Corporation, Philadelphia, Pa., a corporation of Delaware, and said Geigle assignor to Sun Oil Company, Philadelphia, Pa., a corporation of New Jersey
No Drawing. Filed June 7, 1960, Ser. No. 34,384
7 Claims. (Cl. 260—45.75)

This invention relates to the stabilization of solid, substantially crystalline, isotactic polypropylene, and more particularly to new compositions of matter comprising such a solid polymer of relatively high molecular weight and an inhibitor therefor.

Solid, substantially crystalline, isotactic polypropylene can be prepared by the polymerization of propylene using a solid catalytic material. A catalyst system which is especially effective for such a polymerization is the combination of a halide of titanium, such as titanium trichloride, and an aluminum trialkyl, such as aluminum triethyl. In a typical procedure, the catalyst is prepared by admixing, for example, titanium tetrachloride and aluminum triethyl in an inert solvent such as isooctane to produce a reaction product which acts as a catalyst for polymerizing the alpha-olefin to solid polymers. On the other hand, a lower halide, such as titanium trichloride, can be performed, dispersed in an inert liquid, and an activator, such as an aluminum trialkyl, added. In performing the polymerization step, the monomer is contacted with the solid catalyst, such as by passing the propylene into the liquid reaction mixture and is thereby polymerized to solid polymers. Anhydrous and oxygen-free conditions are used throughout the process, since the catalyst is deactivated by contact with water or oxygen. Other specific catalyst systems, i.e., other metal halide or metal oxide catalyst systems, as well as the other process condition, necessary for the preparation of the polypropylene described herein are illustrated by pages 350 through 361, pages 416 through 419, pages 452 and 453 of "Linear and Stereoregular Addition Polymers" by Norman G. Gaylord and Herman F. Mark, Interscience Publishers, 1959, the contents of which are incorporated herein by reference.

Polypropylene prepared by the process described above has a melting point of from 160° C. to 170° C., a tensile strength of from 3,000 to 6,000 p.s.i. (pounds per square inch), and a molecular weight of from 50,000 to 850,000 or more (light-scattering). Usually, a mixture of crystalline and amorphorus polymer is obtained. If desired, the amorphorus polymer can be separated from the crystalline polymer which is isotactic in nature by contacting a mixture thereof with a hydrocarbon solvent, such as isooctane or n-heptane, at an elevated temperature. The amorphous polymer is substantially soluble under these conditions, whereas the crystalline polymer is substantially insoluble. The compositions of the present invention are prepared from either crystalline or mixtures of crystalline with amorphous polymers in which the mixture contains at least 25%, and preferably at least 50%, by weight of the crystalline polymer.

Such polymers may be molded or otherwise fabricated to form many useful articles. However, the above-described polypropylene is susceptible to degradation caused by exposure to light. Particularly severe degradation of polypropylene takes place when it is exposed to light in the ultra-violet portion of the spectrum. This degradation apparently results from free-radical formation, which formation is promoted by ultra-violet light and impurities such as metals and metal compounds. The free-radicals which are formed undergo further chemical reactions, resulting in undesirable chemical and physical transformations. Thus polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a material effective to stabilize the polymer against degradation. It is a specific object of this invention to provide compositions comprising the above-described polypropylene containing minor quantities of a stabilizing material effective to substantially prevent degradation of the polymer caused by exposure to light, particularly the ultraviolet portion of the spectrum.

According to one embodiment of the present invention, applicants have found that remarkably stable polypropylene compositions may be prepared by admixing with the substantially crystalline, solid, isotactic polymer a stabilizing quantity of a dithiocarbamate having the general formula:

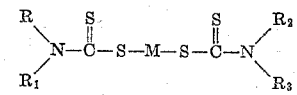

wherein each of R, $R_1$, $R_2$, and $R_3$ is a hydrocarbon radical having from 1 to about 18 carbon atoms and M is nickel or cobalt. The hydrocarbon radicals may be the same or different alkyl, aralkyl, aryl, or cycloalkyl groups. For example, suitable compounds for use as the stabilizers of this invention include: nickel dipropyldithiocarbamate, cobalt dipropyldithiocarbamate, nickel dibutyldithiocarbamate, cobalt dibutyldithiocarbamate, nickel dihexyldithiocarbamate, cobalt dihexyldithiocarbamate, nickel dioctyldithiocarbamate, cobalt dioctyldithiocarbamate, nickel dilauryldithiocarbamate, cobalt dilauryldithiocarbamate, nickel distearyldithiocarbamate, cobalt distearyldithiocarbamate, nickel dibenzyldithiocarbamate, cobalt dibenzyldithiocarbamate, nickel dicyclohexyldithiocarbamate, cobalt dicyclohexyldithiocarbamate, nickel dicyclopentyldithiocarbamate, cobalt dicyclopentyldithiocarbamate, nickel diphenyldithiocarbamate, cobalt diphenyldithiocarbamate, nickel dinaphthyldithiocarbamate, cobalt dinaphthyldithiocarbamate and the like.

The use of a stabilizing quantity, i.e., from about 0.05% to about 5% by weight of the dithiocarbamate of this invention, preferably about 0.2% to about 2.0%, in combination with the polypropylene described herein imparts remarkable stability thereto against degradation caused by exposure to light, particularly that portion of the spectrum which includes ultra-violet light. Numerous stabilizers have been disclosed in the prior art for arresting degradation of other olefin polymers. However, it has been found that virtually none of them are useful in the polypropylene of this invention; see page 192, volume 37, No. 5 of "Modern Plastics," January 1960. It is clear then that the probable mechanism by which the olefin polymers known heretofore degrade is entirely different from the mechanism by which polypropylene degrades. Accordingly the mechanism by which polypropylene is stabilized is unrelated to that by which other olefin polymers are stabilized.

The stabilizing ingredients may be combined with the polypropylene by any method suitable for the preparation of homogeneous mixtures. For example, the polymer may be melted and the additives admixed therewith by milling on heated rolls, or by using a Banbury mixer. Alternatively, the additives may be combined, in a solid or molten state, with a solution or suspension of the polymer in a suitable liquid. In another process, one dissolves the stabilizer in a suitable solvent, admixes powdered polymer therewith, and evaporates the solvent. In another mode of operation, the solid stabilizer is thoroughly dry-mixed with the solid polymer. In general, it is preferable that the mixing process be carried out in an inert atmosphere, or under vacuum, in order to prevent oxidation of the polymer.

Several criteria are used to determine the effectiveness of the stabilizers in the compositions of this invention. Since unstabilized polypropylene is normally drastically degraded when exposed to ultra-violet and visible light, particularly the high ultra-violet and the low visible light, the extent of this degradation is measured. One method of determining the extent of degradation involves the use of the Carbon-Arc Lamp Test in the Atlas Fade-ometer, substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not there has been any breakage. If so, the test is terminated; if not the test is continued until breakage occurs. Meanwhile, at 60-hour intervals, the filaments are tested on an Instron tensile tester and compared with unexposed filaments. In the illustrative examples given below, the filaments (i.e., mono or multifilaments) are wound on standard black faced "mirror" cards (6½ x 9⅓ inches) and secured thereto at the margin with cellophane tape. Winding thereof is performed using a Universal winding device at a tension of 0.75 g., and when so-wound, each card contains 3 groups of filaments having 5 to 8 monofilaments or multifilaments in each group.

The following examples are given by way of illustration and not by way of limitation, the scope of the invention being determined by the appended claims.

*Examples 1–3*

Polypropylene monofilaments having a denier of about 125 to 150 and containing the stabilizer specified in Table I were exposed in an Atlas Fade-ometer for 120 hours giving the results tabulated below.

TABLE I

| Example | Stabilizer (percent by weight) | Unexposed Tenacity (g./den.) | Exposed Tenacity (g./den.) |
|---|---|---|---|
| 1 | 0.5% Nickel di-(n-propyl)-dithiocarbamate. | 5.86 | 6.00 |
| 2 | 0.5% Nickel di-(n-hexyl)-dithiocarbamate. | 5.65 | 6.06 |
| 3 | 0.5% Nickel di-(2-ethylhexyl)-dithiocarbamate. | 5.58 | 5.73 |

Polypropylene monofilaments prepared and tested in an identical manner, but which contained no ultra-violet stabilizer, lost all tenacity between 20 and 40 hours exposure in the Fade-ometer.

*Examples 4–10*

The procedure of Examples 1–3 is repeated with monofilaments of approximately the same denier and some of the same stabilizers, as well as others, for 120 hours, giving the results tabulated in Table II.

TABLE II

| Example | Stabilizer (percent by weight) | Unexposed Tenacity (g./den.) | Exposed Tenacity (g./den.) |
|---|---|---|---|
| 4 | 0.5% Cobalt di-(n-propyl)-dithiocarbamate. | 5.52 | 5.60 |
| 5 | 0.5% Cobalt di-(n-hexyl)-dithiocarbamate. | 5.45 | 5.51 |
| 6 | 0.5% Cobalt di-(2-ethylhexyl)-dithiocarbamate. | 5.61 | 5.74 |
| 7 | 0.5% Cobalt dicyclohexyldithiocarbamate. | 5.41 | 5.46 |
| 8 | 0.5% Nickel dicyclohexyldithiocarbamate. | 5.51 | 5.63 |
| 9 | 0.5% Nickel dilauryl dithiocarbamate. | 5.56 | 5.69 |
| 10 | 0.5% Cobalt dilauryl dithiocarbamate. | 5.54 | 5.65 |

Thus whereas all of the stabilized filaments retain 100% of tenacity after 120 hours, unstabilized polypropylene filaments lose all tenacity between 20 and 40 hours in the Fade-ometer. When the same quantity of each of nickel distearyldithiocarbamate, cobalt distearyldithiocarbamate, nickel diphenyldithiocarbamate, and cobalt dinaphthyldithiocarbamate are incorporated into polypropylene monofilaments and these filaments exposed in the Fade-ometer for 120 hours, no breaks therein are observed.

*Examples 11–17*

Polypropylene monofilaments having a denier of about 125 to 150 and containing the stabilizer specified in Table III were exposed in an Atlas Fade-ometer giving the results tabulated below.

TABLE III

| Example | Stabilizer (percent by weight) | Fade-ometer Hours to Break | Percent Tenacity Retained, Fade-ometer Hours |
|---|---|---|---|
| 11 | 0.2% Nickel di-(n-propyl)-dithiocarbamate | 120 | 100% at 60 hours. |
| 12 | 0.2% Nickel di-(n-hexyl)-dithiocarbamate | 140 | 63% at 120 hours. |
| 13 | 0.4% Nickel di-(n-hexyl)-dithiocarbamate | 240 | 100% at 180 hours. |
| 14 | 0.2% Nickel di-(2-ethyl-hexyl)-dithiocarbamate | 260 | 67% at 240 hours. |
| 15 | 0.2% Nickel di-(n-butyl)-dithiocarbamate | 180 | 94% at 120 hours. |
| 16 | 0.3% Nickel di-(n-butyl)-dithiocarbamate | 240 | 98% at 180 hours. |
| 17 | None | 20–40 | None at 40 hours. |

Thus whereas the control broke at some time between 20 and 40 hours, the stabilized filaments retained tenacity from 120 to 240 hours.

*Examples 18–44*

Polypropylene monofilaments having a denier of about 125 to 150 and containing one of the additives specified in Table IV, known as stabilizers in other polymeric materials, were exposed in an Atlas Fade-ometer giving the results tabulated below.

TABLE IV

| Example | Additive (percent by weight) | Fade-ometer Hours to Break | Percent Tenacity Retained, Fade-ometer Hours |
|---|---|---|---|
| 18 | 0.25% Zinc di-(n-butyl)-dithiocarbamate | 20-40 | None at 40 hours. |
| 19 | 0.5% Zinc di-(n-butyl)-dithiocarbamate | 20-40 | Do. |
| 20 | 1.0% Zinc di-(n-butyl)-dithiocarbamate | 20-40 | Do. |
| 21 | 0.1% Zinc dimethyl-dithiocarbamate | 20-40 | Do. |
| 22 | 0.2% Zinc dimethyl-dithiocarbamate | 20-40 | Do. |
| 23 | 0.1% Tetramethyl thiuram monosulfide | 0-20 | None at 20 hours. |
| 24 | 0.3% Tetramethyl thiuram monosulfide | 0-20 | Do. |
| 25 | 0.4% Tetramethyl thiuram monosulfide | 0-20 | Do. |
| 26 | 0.1% Tetraethyl thiuram disulfide | 20-40 | None at 40 hours. |
| 27 | 0.2% Tetraethyl thiuram disulfide | 20-40 | Do. |
| 28 | 0.3% Tetraethyl thiuram disulfide | 20-40 | Do. |
| 29 | 0.4% Tetraethyl thiuram disulfide | 0-20 | None at 20 hours. |
| 30 [1] | 0.5% Lead dimethyldithiocarbamate | 20-40 | None at 40 hours. |
| 31 [2] | 0.5% Selenium diethyldithiocarbamate | 20-40 | Do. |
| 32 | 0.5% Bismuth dimethyldithiocarbamate | 20-40 | Do. |
| 33 [2] | 0.5% Tellurium diethyldithiocarbamate | 20-40 | Do. |
| 34 | 0.5% Nickel Stearate | 0-20 | None at 20 hours. |
| 35 | 0.5% 2,2'-dihydroxy-4-methoxybenzophenone | 20-40 | None at 40 hours. |
| 36 | 1.0% 2,2'-dihydroxy-4-methoxybenzophenone | 20-40 | Do. |
| 37 | 1.5% 2,2'-dihydroxy-4-methoxybenzophenone | 20-40 | Do. |
| 38 | 2.0% 2,2'-dihydroxy-4-methoxybenzophenone | 20-40 | Do. |
| 39 | 0.5% 2,2'-dihydroxy-4-octoxybenzophenone | 20-40 | Do. |
| 40 | 0.1% 2-hydroxy-4-methoxybenzophenone | 20-40 | Do. |
| 41 | 1.0% Octyl phenyl salicylate | 20-40 | Do. |
| 42 | 1.5% Octyl phenyl salicylate | 20-40 | Do. |
| 43 | 2.0% Octyl phenyl salicylate | 20-40 | Do. |
| 44 | None | 20-40 | Do. |

[1] Turned black during melt-extrusion.
[2] Turned black and fumed during melt-extrusion.

The foregoing tables illustrate the unexpected nature of this invention. Table I, Table II, and Table III each illustrate the substantial effectiveness of the stabilizers of this invention. Table IV, on the other hand, shows that none of the many chemically related materials (Examples 18-33) were effective even though they are taught in the prior art as stabilizers for other polymers. Example 34 shows that not every nickel compound is effective as a stabilizer for polypropylene. This table also shows that other well-known ultra-violet absorbers are ineffective in polypropylene (Examples 35-43). Significantly the filaments containing the additives covered by Examples 18-22 26-28, 30-33, and 35-43 broke at some point between 20 and 40 hours and had no tensile strength at 40 hours. These additives are entirely ineffective as stabilizers against degradation caused by exposure in the Fade-ometer, for the same results obtain with the unstabilized polypropylene of Example 44. Moreover, the polypropylene filaments containing the additives covered by Examples 23-25, 29 and 34 are less stable than the control covered by Example 44, for in each of the former examples, the filaments broke between 0 and 20 hours and had no tensile strength at 20 hours.

Examples 45-48

Polypropylene monofilaments containing 0.3, 1.0 and 2.0 weight percent of cobalt dibutyldithiocarbamate were exposed in the Fade-ometer giving the results tabulated in Table V as Examples 45, 46 and 47 respectively. The monofilaments containing 1.0 and 2.0% of the stabilizer were exposed in an air oven at 125° C. giving the results tabulated in Examples 46 and 47 below.

Thus each of the sets of monofilaments containing the stabilizer shows good stability when exposed in the Fade-ometer and the sets containing 1.0 and 2.0% of the stabilizer show good heat stability, noting that these two sets of polypropylene filaments were unbroken beyond 640 hours in the Fade-ometer.

Examples 49-56

Polypropylene monofilaments containing nickel dibutyldithiocarbamate at 1.0, 1.5 and 2.0 weight % levels were exposed in the Fade-ometer, the results thereof being tabulated in Table VI as Examples 49, 50 and 51 respectively. In Examples 52 and 53, polypropylene monofilaments containing 1.0 and 2.0 weight % respectively of ferric dibutyldithiocarbamate were exposed in the Fade-ometer. In Examples 54 and 55 there were exposed in the Fade-ometer polypropylene monofilaments containing 1.0 and 2.0 weight % respectively of a compound having the probable [1] formula:

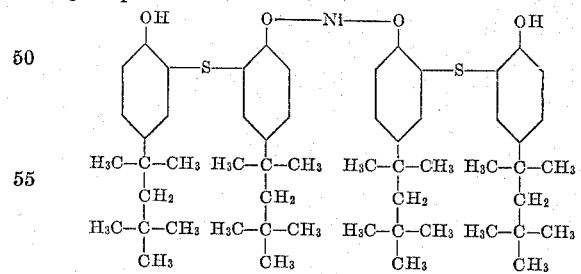

[1] See Belgian Patent 579,636, published first half of December 1959, application filed first half of June 1959.

TABLE V

| Example | Stabilizer, Weight percent | Percent Tenacity Retained, Fade-ometer Hours | Fade-ometer To Break (Hours) | 125° C. Air Oven (Hours) |
|---|---|---|---|---|
| 45 | 0.3% Cobalt dibutyldithiocarbamate | 109% at 120 hours | 280 | |
| 46 | 1.0% Cobalt dibutyldithiocarbamate | 108% at 300 hours | >640 | 404-464 |
| 47 | 2.0% Cobalt dibutyldithiocarbamate | 95% at 300 hours | >640 | 404-464 |
| 48 | None | None at 40 hours | 20-40 | ~7 |

TABLE VI

| Example | Fade-ometer Hours to Break | Percent Tenacity Retained, Fade-ometer Hours |
|---|---|---|
| 49 | 740 | 89% at 600 hours. |
| 50 | >1,011.5 | 76% at 1,011.5 hours. |
| 51 | >1,000 | 103% at 1,000 hours. |
| 52 | 60–80 | 22.5% at 60 hours. |
| 53 | 60–80 | |
| 54 | 300 | 60% at 180 hours. |
| 55 | 420 | 70% at 300 hours. |
| 56 [1] | 20–40 | None at 40 hours. |

[1] Control, no stabilizer.

The foregoing table is particularly significant in considering the unexpected nature of this invention. Whereas it has been shown herein that both nickel and cobalt dialkyldithiocarbamates are singularly effective in stabilizing polypropylene against the degradation caused by exposure to light, ferric dibutyldithiocarbamate shown in Examples 52 and 53 is virtually ineffective as a light stabilizer therefor. Moreover, the nickel phenolate of Examples 54 and 55 is one of the only light stabilizers shown in the prior art as being useful in polypropylene, and yet it is obviously vastly inferior to the stabilizers of the present invention.

*Examples 57–59*

Polypropylene monofilaments containing 0.1 and 0.5 weight percent of nickel di-sec.butyl-dithiocarbamate were exposed in the Fade-ometer giving the properties tabulated in Examples 57 and 58 respectively.

TABLE VII

| Example | Fade-ometer Hours to Break | Percent Tenacity Retained, Fade-ometer Hours |
|---|---|---|
| 57 | 140 | |
| 58 | >300 | 83% at 300 hours. |
| 59 [1] | 20–40 | None at 40 hours. |

[1] Non-stabilized polypropylene.

The invention claimed is:
1. A light-stable composition comprising solid, isotactic, substantially crystalline polypropylene and a stabilizing quantity of a dithiocarbamate having the general formula:

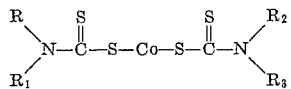

wherein each of R, $R_1$, $R_2$, and $R_3$ is a hydrocarbon radical containing 1 to about 18 carbon atoms and M is selected from the group consisting of nickel and cobalt.

2. The composition of claim 1 wherein said stabilizing quantity is from about 0.05% to about 5% by weight of said composition.

3. The composition of claim 1 wherein said stabilizing quantity is from about 0.2% to about 2% by weight of said composition.

4. The composition of claim 1 wherein said dithiocarbamate is cobalt dipropyldithiocarbamate.

5. The composition of claim 1 wherein said dithiocarbamate is cobalt dibutyldithiocarbamate.

6. The composition of claim 1 wherein said dithiocarbamate is cobalt di-(2-ethylhexyl)-dithiocarbamate.

7. The composition of claim 1 wherein said dithiocarbamate is cobalt dihexyldithiocarbamate.

References Cited by the Examiner

UNITED STATES PATENTS 2,889,306  6/1959  Hawkins et al. _____ 260—45.9
3,001,969  9/1961  Tholstrup et al. ____ 260—45.75

FOREIGN PATENTS 684,976  12/1952  Great Britain.
495,814  6/1954  Italy.

OTHER REFERENCES

Polypropylene, Kresser, Rheinhold Publishing Co., N.Y., 1960, pages 41–42.

LEON J. BERCOVITZ, *Primary Examiner.*

ALPHONSO D. SULLIVAN, MILTON STERMAN, *Examiners.*

R. W. GRIFFIN, J. H. HALL, *Assistant Examiners.*